(12) United States Patent
Weiss et al.

(10) Patent No.: US 11,409,273 B2
(45) Date of Patent: Aug. 9, 2022

(54) DEVICE AND METHOD FOR DETERMINING THE PINPOINT-ABILITY OF POSSIBLE DEFECTS OF ONE OR MULTIPLE COMPONENT(S)

(71) Applicant: Robert Bosch GmbH, Stuttgart (DE)

(72) Inventors: Patrick Weiss, Remseck Am Neckar (DE); Philipp Hagemann, Schorndorf (DE); Robert Manfred Zielke, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 643 days.

(21) Appl. No.: 16/468,633

(22) PCT Filed: Dec. 11, 2017

(86) PCT No.: PCT/EP2017/082213
§ 371 (c)(1),
(2) Date: Jun. 11, 2019

(87) PCT Pub. No.: WO2018/108809
PCT Pub. Date: Jun. 21, 2018

(65) Prior Publication Data
US 2020/0081427 A1  Mar. 12, 2020

(30) Foreign Application Priority Data
Dec. 15, 2016 (DE) .......................... 102016225081.7

(51) Int. Cl.
*G05B 23/02* (2006.01)
*G06F 17/16* (2006.01)

(52) U.S. Cl.
CPC ....... *G05B 23/0275* (2013.01); *G05B 23/024* (2013.01); *G05B 23/0272* (2013.01); *G06F 17/16* (2013.01)

(58) Field of Classification Search
CPC ............ G05B 23/0275; G05B 23/0241; G05B 23/0272; G06F 17/16
See application file for complete search history.

(56) References Cited

U.S. PATENT DOCUMENTS

| 5,544,308 A | 8/1996 | Giordano et al. |
| 7,774,651 B2 * | 8/2010 | Mukherjee ............ G06F 11/079 714/26 |

(Continued)

FOREIGN PATENT DOCUMENTS

| CN | 101753382 A | 6/2010 |
| CN | 102460321 A | 5/2012 |

(Continued)

OTHER PUBLICATIONS

International Search Report for PCT/EP2017/082213, dated May 4, 2018.

*Primary Examiner* — Bryan Bui
(74) *Attorney, Agent, or Firm* — Norton Rose Fulbright US LLP; Gerard A. Messina

(57) ABSTRACT

A device for determining whether a defect of a component is determinable based on results of predefined diagnostic options, including: storing, in a matrix, parameters which, for each combination of one component defect and one diagnosis result, provide a measure of whether the respective defect is possible for the respective diagnosis result, the matrix rows being assigned to one of the diagnosis results, the matrix columns being assigned to one of the defects; selecting at least two matrix rows which, for a diagnosis result consistent with the defect to be identified, include a parameter greater than a predefined first limiting value; calculating a result vector by the element-wise multiplication of the selected matrix rows; and determining whether the result vector includes at least one element not smaller (Continued)

|   | A | B | C | D | E | F | G | H |
|---|---|---|---|---|---|---|---|---|
|   | K1, F11 | K1, F12 | K1, F13 | K2, F21 | K2, F22 | K3, F31 | K4, F41 |   |
| 1 | DM1 (-) | 1 | 1 | 0 | 0 | 1 | 0 | 0 | 10 |
| 2 | DM1 (+) | 0 | 1 | 1 | 1 | 0 | 1 | 1 | 10 |
| 3 | DM2 (-) | 0 | 1 | 1 | 0 | 1 | 1 | 0 | 20 |
| 4 | DM2 (+) | 1 | 0 | 0 | 1 | 1 | 0 | 1 | 20 |
| 5 | DM3 (-) | 0 | 0 | 0 | 0 | 1 | 1 | 1 | 30 |
| 6 | DM3 (+) | 1 | 1 | 1 | 1 | 0 | 0 | 0 | 30 | than a predefined second limiting value, the result vector elements, which are smaller, not being greater than a predefined third limiting value.

10 Claims, 3 Drawing Sheets

(56) References Cited

U.S. PATENT DOCUMENTS

| | | | |
|---|---|---|---|
| 8,306,783 B2 * | 11/2012 | Duc | G05B 23/0251 702/185 |
| 2010/0017167 A1 | 1/2010 | Duc et al. | |
| 2011/0137711 A1 | 6/2011 | Singh et al. | |
| 2011/0145026 A1 | 6/2011 | Singh et al. | |
| 2011/0208680 A1 | 8/2011 | Bovey et al. | |
| 2012/0232743 A1 | 9/2012 | Singh | |

FOREIGN PATENT DOCUMENTS

| | | |
|---|---|---|
| CN | 102818948 A | 12/2012 |
| DE | 102007041848 A1 | 3/2009 |
| EP | 2568433 A1 | 3/2013 |
| FR | 2821161 A1 | 8/2002 |
| WO | 2006077590 A2 | 7/2006 |

* cited by examiner

Fig. 2

| | A | B | C | D | E | F | G | H |
|---|---|---|---|---|---|---|---|---|
| | K1, F11 | K1, F12 | K1, F13 | K2, F21 | K2, F22 | K3, F31 | K4, F41 | |
| 1 DM1 (−) | 1 | 1 | 0 | 0 | 1 | 0 | 0 | 10 |
| 2 DM1 (+) | 0 | 1 | 1 | 1 | 0 | 1 | 1 | 10 |
| 3 DM2 (−) | 0 | 1 | 1 | 0 | 1 | 1 | 0 | 20 |
| 4 DM2 (+) | 1 | 0 | 0 | 1 | 1 | 0 | 1 | 20 |
| 5 DM3 (−) | 0 | 0 | 0 | 0 | 1 | 1 | 1 | 30 |
| 6 DM3 (+) | 1 | 1 | 1 | 1 | 0 | 0 | 0 | 30 |

Fig. 3

|  | K1, F1 | K2, F2 | K3, F3 | K4, F4 |
|---|---|---|---|---|
| DM1 (-) | 1 | 0 | 0 | 0 |
| DM1 (+) | 0 | 1 | 1 | 1 |
| DM2 (-) | 1 | 1 | 0 | 1 |
| DM2 (+) | 1 | 0 | 1 | 1 |
| DM3 (-) | 1 | 1 | 0 | 1 |
| DM3 (+) | 0 | 0 | 1 | 0 |

DEVICE AND METHOD FOR DETERMINING THE PINPOINT-ABILITY OF POSSIBLE DEFECTS OF ONE OR MULTIPLE COMPONENT(S)

FIELD OF THE INVENTION

The present invention relates to a device and to a method for determining whether a possible defect of one or multiple component(s) is "pinpoint-able", i.e., whether the defect is unambiguously determinable based on results of predefined diagnostic options. The components are, in particular, components of a motor vehicle.

BACKGROUND INFORMATION

In the diagnostic options analysis (DOA), all functions of a component are analyzed, and possible defect patterns are derived from the results, for recording and evaluating the diagnostic capability in the case of component defects.

Afterwards, a list of the diagnostic options including the evaluation (pinpoint-ability and applicability) is created.

From these and other characteristics, finally a process-conforming characteristics, the diagnostic capability, is calculated.

An important factor for this characteristic is the information as to whether a defect of a component is unambiguously identifiable by available diagnostic options, or by diagnostic options available in the future, i.e., whether the defect is pinpoint-able.

SUMMARY OF THE INVENTION

It is an object of the present invention to simplify the decision as to whether a diagnostic option or a combination of diagnostic options is pinpoint-capable and to improve the quality of the result.

According to one specific embodiment of the present invention, a method for determining whether a possible defect of one or multiple component(s) is unambiguously determinable based on results of predefined diagnostic options, and is thus pinpoint-able, includes:
(a) selecting the components to be checked;
(b) providing a number of diagnostic options, each diagnostic option supplying a positive or a negative diagnosis result;
(c) providing numerical parameters which, for each combination of one possible defect of one of the selected components and one possible diagnosis result, are a measure of whether the respective defect is possible (may exist) when the respective diagnosis result is present;
(d) arranging the numerical parameters in a matrix, each of the rows of the matrix being assigned to one of the possible diagnosis results, and each of the columns of the matrix being assigned to one of the possible defects;
(e) selecting a defect to be identified;
(f) selecting at least one row of the matrix which, for at least one diagnosis result which is consistent with the defect to be identified, includes at least one parameter which is not smaller than a predefined first limiting value;
(g) determining whether at least one of the selected rows includes only a single parameter which is not smaller than the predefined first limiting value, and whether the other parameters in this row are not greater than a predefined third limiting value.

If at least one of the selected rows includes only a single parameter which is not smaller than the predefined first limiting value, and the other parameters in this row are not greater than the predefined third limiting value, the defect to be identified is unambiguously identified by the diagnosis result assigned to this row alone. The method may thus be ended at this point for the particular defect to be identified.

If, however, each of the selected rows includes at least two parameters which are greater than the predefined third limiting value, the defect to be identified is not yet unambiguously identifiable by the diagnosis result assigned to the selected rows, and additionally the following steps are carried out:
(h1) selecting at least two rows of the matrix which, for at least one diagnosis result which is consistent with the defect to be identified, include a parameter which is not smaller than the predefined first limiting value;
(h2) calculating a result vector by the element-wise multiplication of the selected rows of the matrix;
(h3) determining whether the result vector includes at least one element which is greater than a predefined second limiting value, the elements of the result vector which are smaller than the predefined second limiting value not being greater than a predefined third limiting value.

According to one specific embodiment of the present invention, a device for determining whether a possible defect of one or multiple component(s) is unambiguously determinable based on results of predefined diagnostic options, and is thus pinpoint-able, includes:
(a) a memory device which is configured to store, in a matrix, numerical parameters which, for each combination of one possible defect of one of the components and one possible diagnosis result, are a measure of whether the respective defect is possible (may exist) when the respective diagnosis result is present, each of the rows of the matrix being assigned to one of the possible diagnosis results, and each of the columns of the matrix being assigned to one of the possible defects;
(b) a selection device which is configured to select rows of the matrix which, for a diagnosis result which is consistent with a defect to be identified, include a parameter which is greater than a predefined first limiting value;
(c) a calculation device which is configured to calculate a result vector by the element-wise multiplication of the selected rows of the matrix;
(d) a determination device which is configured to determine whether the result vector includes at least one element which is not smaller than a predefined second limiting value, all other elements of the result vector which are smaller than the second limiting value not being greater than a predefined third limiting value.

Those skilled in the art will immediately recognize that the role of the rows and columns of the matrix may easily be interchanged.

The first limiting value may be equal to the second limiting value. The first and second limiting values may, in particular, be equal to one ("1"), and the third limiting value may, in particular, be equal to zero ("0").

A device and a method according to exemplary embodiments of the present invention make it possible to carry out an automated evaluation of the pinpoint capability based on complete descriptions of all diagnostic options and a diagnostic options analysis (DOA) of the overall system.

This ensures the process capability, in that the result of the evaluation is no longer dependent on the discretion of individual persons, and the DOA may include the complete and relevant pieces of information required for creating the guided trouble-shooting (GTS) process.

By having all the pieces of information required for the GTS creation available, it is also possible to create an online GTS process which may be dynamically generated from pieces of feedback information from the field on the one hand, and from updated DMO results on the other hand.

Such an automatically generated GTS process may then be utilized on repair shop testers with network access. A connection to a central server is established in the process, and the required pieces of information are dynamically generated there and transmitted.

Exemplary embodiments of the present invention make it possible, for example, to check the components of a vehicle deliberately for certain defects. The DOA also supplies pieces of information as to which defects are possible for which starting point, which, e.g., is predefined by a defect memory entry.

With complete information about all starting points and complete information about all available diagnostic options, the trouble-shooting process may be directly determined. If the diagnostic options do not require an additional tool, it is also possible to make a vehicle assume a diagnostic mode in an automated manner and to then carry out a complete diagnosis, without needing a stay at a repair shop for this purpose.

In one specific embodiment, the method includes determining whether the result vector includes exactly one element which is not smaller than the predefined second limiting value, all other elements of the result vector not being greater than the predefined third limiting value. In this case, the defect is unambiguously determinable based on the selected diagnosis results.

In one specific embodiment, the method includes determining whether multiple elements of the result vector which are greater than the predefined second limiting value belong to the same component. Although, in this case, it is not possible to unambiguously determine the defect based on the selected diagnosis results, it is still possible to unambiguously determine the defective component.

In one specific embodiment, the parameters are either one ("1") or zero ("0"). In this case, the method is particularly easy to carry out, and only little memory space is required for storing the parameters. In particular, only one bit is required for each parameter.

In one alternative specific embodiment, the parameters may have an arbitrary value, in particular a value between zero ("0") and one ("1"). In this way, it is possible to also map intermediate values with the reliability/success probability of individual diagnostic options. In this way, the quality of the decision as to whether a diagnostic option or a combination of diagnostic options is "pinpoint-capable" may be even further improved.

In one specific embodiment, an expenditure parameter is assigned to each diagnostic option which, in particular, describes the time expenditure and/or the costs of the respective diagnostic option. In this specific embodiment, the method includes adding the expenditure parameters of the selected diagnostic options whose parameters are multiplied with one another. This makes it possible to determine the overall expenditure of each selected combination of diagnostic options and to select the combination of diagnostic options having the least overall expenditure in order to be able to carry out the diagnosis with the least possible expenditure.

It is also possible for separate expenditure parameters to be provided for the time expenditure and for the financial expenditure. In this case, both the combination having the least time expenditure and the combination having the least financial expenditure may be selected.

BRIEF DESCRIPTION OF THE DRAWINGS

FIG. 2 shows a matrix including parameters which define the relationship between possible defects of different components and the results of different diagnostic options.

FIG. 3 shows a matrix including parameters which define the relationship between possible defects of different components and the results of different diagnostic options for a specific defect scenario.

DETAILED DESCRIPTION

Figure 1:
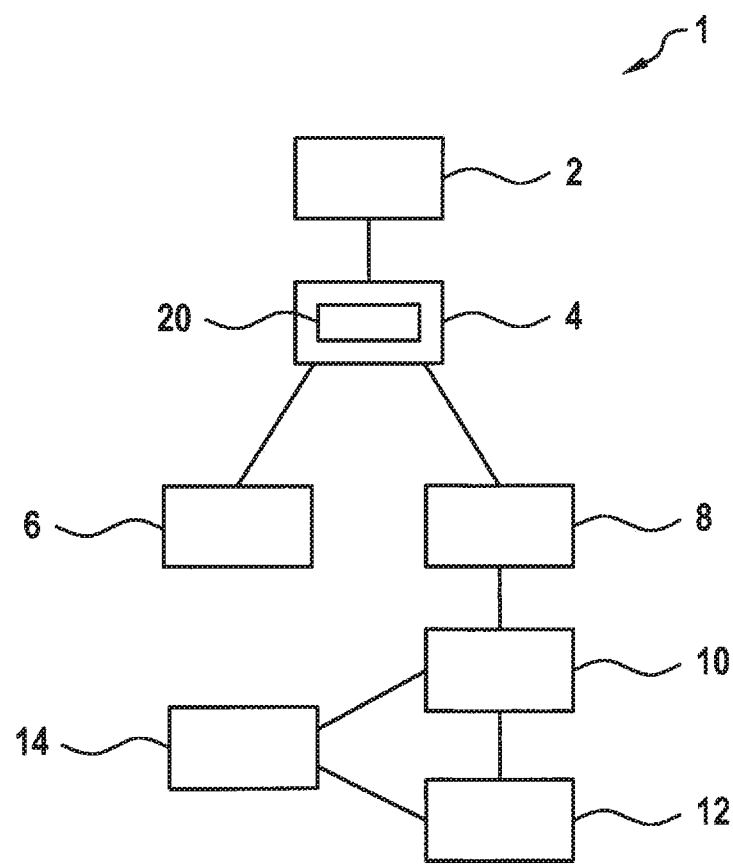
FIG. 1 shows a schematic view of a device according to one exemplary embodiment of the present invention.

FIG. 1 shows a schematic view of a device 1 according to one exemplary embodiment of the present invention.

Device 1 includes an input device 2 which is provided for entering data, in particular parameters, which define the relationship between possible defects of different components and the results of different diagnostic options. Input device 2 may, for example, include a keyboard, a mouse, a touch screen and/or an electronic interface for electronically entering data.

Device 1 furthermore includes a memory device 4 which is configured to store parameters which, for every combination of one possible defect of a component and one possible diagnosis result, provide a measure that the respective defect exists when the respective diagnosis result is present. Memory device 4 is, in particular, configured to store the parameters in a matrix 20, each row of matrix 20 being assigned to a possible diagnosis result, and each column being assigned to a possible defect. As an alternative, the diagnosis results may be assigned to the columns of matrix 20, and the possible defects may be assigned to the rows of matrix 20.

Device 1 also includes a selection device 6 which is configured to select at least two rows of matrix 20 which, for a diagnosis result which is consistent with a defect to be identified, include a parameter which is greater than a predefined first limiting value.

A calculation device 8 is configured to calculate a result vector by the element-wise multiplication of the selected rows of matrix 20, i.e., multiplication of the elements of the rows of matrix 20 situated in the same column of matrix 20.

A determination device 10 is also provided, which is configured to determine whether the result vector includes at least one element which is not smaller than a predefined second limiting value, and whether the other elements of the result vector are not greater than a predefined third limiting value.

Device 1 moreover includes an output device 12 which is configured to output a result ascertained by determination device 10. Output device 12 may, for example, include a monitor, a printer and/or an electronic interface for electronically outputting the results.

FIG. 2 shows a matrix 20 which represents the relationships between possible defects F11, F12, F13, F21, F22, F31, F41 of different components K1, K2, K3, K4 and the results of different diagnostic options DM1, DM2, DM3, DM4.

Each diagnostic option DM1, DM2, DM3, DM4 supplies a positive result (+) (OK) or a negative result (−) (not OK).

Parameter "1" in the matrix means that defect F11, F12, F13, F21, F22, F31, F41 denoted by the respective column may be present in the diagnosis result which corresponds to the respective row.

Parameter "0" in the matrix means that defect F11, F12, F13, F21, F22, F31, F41 denoted by the respective column cannot be present in the diagnosis result which corresponds to the respective row.

For example, when first diagnostic option DM1 supplies a negative (not OK) result (−) (row 1), at least one of defects F11, F12 of first component K1 or defect F22 of second component K2 may be present. Defects F13 of first component K1, F21 of second component K2, and F31, F42 of third and fourth components K3, K4, in contrast, may be excluded.

Accordingly, when first diagnostic option DM1 supplies a positive (OK) result (+) (row 2), at least one of defects F12, F13 of first component K1, F21 of second component K2, F31 of third component K3, or F41 of fourth component K4 may be present. Defects F12 of first component K1 and F22 of second component K2, in contrast, may be excluded.

The result of first diagnostic option DM1 alone is thus not sufficient to unambiguously identify a defect F11, F12, F13, F21, F22, F31, F41 or even only a defective component K1, K2, K3, K4.

The defect may be further isolated by adding further diagnosis results which result from the execution of further diagnostic options DM2, DM3.

To determine a combination of diagnostic options which allows a selected defect F11, F12, F13, F21, F22, F31, F41 to be unambiguously determined, the rows which correspond to the diagnosis results of different diagnostic options are multiplied element-wise with one another, i.e., those parameters of the rows to be multiplied which are situated in the same column are multiplied with one another. The results of these multiplications form the result vector (the result row).

Rows which in the column of selected defect F11, F12, F13, F21, F22, F31, F41 include parameter "0" may remain unconsidered, since selected defect F11, F12, F13, F21, F22, F31, F41 is excluded by definition in these diagnosis results.

A combination of diagnosis results in which this operation, i.e., the element-wise multiplication of the rows, results in a result vector which includes only a single one "1", and otherwise only zeros "0", makes it possible to unambiguously identify defect F11, F12, F13, F21, F22, F31, F41, whose column includes the one "1".

In the example shown in FIG. 2, a combination (element-wise multiplication) of diagnosis results DM1 (−) (row 1) and DM2 (+) (row 4), for example, results in result vector (1/0/0/0/1/0/0). This result vector includes parameter "1" twice. By combining diagnosis results DM1 (−) and DM2 (+), it is thus still not possible to unambiguously determine defect F11, F12, F13, F21, F22, F31, F41 since defect F11 of first component K1 and/or defect F22 of second component K2 may be present.

A combination of diagnosis results DM1 (−) and DM3 (+) (rows 1 and 6) results in result vector (1/1/0/0/0/0/0). This result vector also includes parameter "1" twice. It is therefore not possible to decide whether defect F11 or defect F12 is present. Since the two possible defects F11, F12 are defects of first component K1, defect F11, F12, F13, F21, F22 may at least be isolated to first component K1 by combining diagnosis results DM1 (−) and DM3 (+).

A combination of three diagnosis results DM1 (−), DM2 (+) and DM3 (+) (rows 1, 4 and 6) results in result vector (1/0/0/0/0/0/0). This result vector includes parameter "1" only once. Defect F11 of first component K1 may thus be unambiguously identified by the combination of diagnosis results DM1 (−), DM2 (+) and DM3 (+).

In the same manner, it is also possible to determine combinations of diagnosis results for other defects F12, F13, F21, F22 which make it possible to unambiguously identify the respective defect (F12, F13, F21, F22) ("pinpointing").

In the exemplary embodiment shown in FIG. 2, the parameters in matrix 20 are binary parameters, i.e., parameters which are only able to assume one of the two values "1" or ".".

In one possible exemplary embodiment, which is not shown in the figures, the parameters may also assume values between "0" and "1", for example 0.1 or 0.9. For example, a value of 0.9 would mean that the particular defect F11, F12, F13, F21, F22 may be present with a 90% likelihood if the particular diagnosis result is present.

When two or more diagnosis results are combined, the same calculations (element-wise multiplication of the parameters) are carried out as was described above for the binary case.

A combination of diagnosis results is considered to unambiguously identify a defect F11, F12, F13, F21, F22 when one element of the result vector exceeds a predefined limiting value, for example a value of 0.8, and all other elements of the result vector drop below a further predefined limiting value, for example a value of 0.2.

In this way, it is possible to also map intermediate values with the reliability/success probability of individual diagnostic options, and to thus even further improve the quality of the method.

In column H of matrix 20, an expenditure parameter is stored for each diagnostic option DM1, DM2, DM3, which represents the time and/or financial expenditure associated with carrying out the respective diagnostic option DM1, DM2, DM3. By adding the expenditure parameters stored in matrix 20, the overall expenditure of a combination of diagnostic options DM1, DM2, DM3 may be determined.

In the example shown in FIG. 2, the combination of diagnostic options DM1 and DM2 (rows 1 and 4) has the total expenditure 10+20=30, the combination of diagnostic options DM1 and DM3 (rows 1 and 6) has the total expenditure 10+30=40, and the combination of diagnostic options DM1, DM2 and DM3 (rows 1, 4 and 6) has the total expenditure 10+20+30=60.

If multiple different combinations of diagnostic options make it possible to unambiguously identify a defect, a diagnosis selection device 14 may select the combination having the least overall time and/or financial expenditure. In this way, the diagnosis may be carried out as quickly (least time expenditure) and/or as cost-effectively (least financial expenditure) as possible.

It is also possible for separate expenditure parameters to be provided for the time expenditure and the financial expenditure.

This makes it possible to optionally select the combination having the least time expenditure or the combination having the least financial expenditure.

Those skilled in the art understand that the role/function of the rows and columns of matrix 20 may be interchanged, without this impairing the execution or the result of the method.

The application of a method according to the present invention to a specific defect scenario is described hereafter based on FIG. 3.

Based on the defect pattern "the starter turns, but the engine does not start", the following possible defect sources Fx were identified:

F1: leak in high pressure rail K1 of the internal combustion engine

F2: low pressure sensor K2 indicates a value which is too high

F3: fuel level in surge tank K3 is too low

F4: delivery rate of high pressure pump K4 is too low

For the diagnosis, the following diagnostic options DMx are available:

DM1: visually checking high pressure rail K1

DM2: measuring the fuel pump return flow

DM3: measuring the delivery volume of the fuel pump

The relationships between possible defect sources Fx and available diagnostic options DMx are symbolized by the parameters in matrix 20 shown in FIG. 3.

Carrying out a method according to one exemplary embodiment of the present invention in this case yields the following results:

Leak in high pressure rail K1 (F1):

Pinpointing is possible since a visual check of the high pressure rail (DM1 (−)) alone already yields a result vector (1/0/0/0) which meets the pinpoint requirements.

Low pressure sensor K2 indicates a value which is too high (F2):

The method supplies result vector (0/1/1/1)×(1/1/0/1)×(1/1/0/1)=(0/1/0/1), which includes the value one "1" twice.

This means that pinpointing is not possible since even with a combination of all diagnostic options DM1, DM2, DM3, in addition to the possibility of a defective low pressure sensor K2 (F2), there also remains the possibility of the delivery rate of high-pressure pump K4 (F4) being too low.

Fuel level in surge tank K3 is too low (F3):

Pinpointing is possible since a check of the delivery volume (DM4 (+)) already yields a result vector (0/0/1/0) which meets the pinpoint requirements.

Delivery rate of high pressure pump K4 is too low (F4):

Since there is a one "1" in both instances in diagnostic option DM2 "measuring the return flow," i.e., two paths are possible, the two possible paths must be considered in this case:

Path 1: "visually checking the high pressure rail (+) and testing the delivery volume (−) and measuring the return flow (+)":

Result vector: (0/1/1/1)×(1/1/0/1)×(1/0/1/1)=(0/0/0/1) ⇒Pinpointing is possible.

Path 2: "visually checking the high pressure rail (+) and testing the delivery volume (−) and measuring the return flow (−)":

Result vector: (0/1/1/1)×(1/1/0/1)×(1/1/0/1)=(0/1/0/1) ⇒Pinpointing is not possible. This diagnostic gap must be taken into consideration in the evaluation of the diagnostic capability.

Since it is necessary to check the delivery volume (DM3) in both instances, this diagnostic option may be carried out at the very beginning.

As an alternative, the visual check of high pressure rail K1 (DM1) may be carried out first, since it immediately results in pinpointing if the result is negative (−).

The order may be derived from the probabilities of occurrence of individual defects F1, F2, F3, F4 recorded in the DMO or may be dynamically generated from pieces of feedback information from the field.

What is claimed is:

1. A method for determining whether a possible defect of one or multiple component(s) is unambiguously determinable based on results of predefined diagnostic options, the method comprising:
(a) selecting the components to be checked;
(b) providing a number of diagnostic options, each diagnostic option supplying a positive or a negative diagnosis result;
(c) providing numerical parameters which, for each combination of one possible defect of one of the selected components and one possible diagnosis result, are a measure of whether the respective defect is possible when the respective diagnosis result is present;
(d) arranging the numerical parameters in a matrix, each of the rows of the matrix being assigned to one of the possible diagnosis results, and each of the columns of the matrix being assigned to one of the possible defects;
(e) selecting a defect to be identified;
(f) selecting at least one row of the matrix which, for at least one diagnosis result which is consistent with the defect to be identified, includes at least one parameter which is not smaller than a predefined first limiting value;
(g) determining whether at least one of the selected rows includes only one parameter which is not smaller than the predefined first limiting value, and whether the other parameters of this row are not greater than a predefined third limiting value;
(h) when all selected rows include at least two parameters which are greater than the predefined third limiting value:
(h1) selecting at least two rows of the matrix which, for at least one diagnosis result which is consistent with the defect to be identified, includes one parameter which is greater than the predefined first limiting value;
(h2) calculating a result vector by the element-wise multiplication of the selected rows of the matrix; and
(h3) determining whether the result vector includes at least one element which is not smaller than a predefined second limiting value, the elements of the result vector which are smaller than the predefined second limiting value not being greater than a predefined third limiting value.

2. The method of claim 1, further comprising:
determining whether the result vector includes exactly one element which is not smaller than the predefined second limiting value, the other elements of the result vector not being greater than the predefined third limiting value, or whether the elements of the result vector which are not smaller than the predefined second limiting value are assigned to the same component.

3. The method of claim 1, wherein the parameters are greater than or equal to zero "0" and smaller than or equal to one "1", the parameters in particular being equal to zero "0" or one "1".

4. The method of claim 1, wherein an expenditure parameter is assigned to each diagnostic option which, in particular, describes the expenditure and/or the costs of the respective diagnostic option, the method including adding the expenditure parameters of the selected diagnostic options whose parameters are multiplied with one another to determine the overall expenditure, the method in particular including selecting the combination of diagnostic options which has the least overall expenditure.

5. A method for determining whether a possible defect of one or multiple component(s) is unambiguously determinable based on results of predefined diagnostic options, the method comprising:
(a) selecting the components to be checked;
(b) providing a number of diagnostic options, each diagnostic option supplying a positive or a negative diagnosis result;
(c) providing numerical parameters which, for each combination of one possible defect of one of the selected components and one possible diagnosis result, are a measure of whether the respective defect is possible when the respective diagnosis result is present;
(d) arranging the numerical parameters in a matrix, each of the columns of the matrix being assigned to one of the possible diagnosis results, and each of the rows of the matrix being assigned to one of the possible defects;
(e) selecting a defect to be identified;
(f) selecting at least one column of the matrix which, for at least one diagnosis result which is consistent with the defect to be identified, includes at least one parameter which is not smaller than a predefined first limiting value;
(g) determining whether at least one of the selected columns includes only one parameter which is not smaller than the predefined first limiting value, and whether the other parameters of this column are not greater than a predefined third limiting value;
(h) when all selected columns include at least two parameters which are greater than the predefined third limiting value:
(h1) selecting at least two columns of the matrix which, for at least one diagnosis result which is consistent with the defect to be identified, include one parameter which is greater than the predefined first limiting value;
(h2) calculating a result vector by the element-wise multiplication of the selected columns of the matrix; and
(h3) determining whether the result vector includes at least one element which is not smaller than a predefined second limiting value, the elements of the result vector which are smaller than the predefined second limiting value not being greater than a predefined third limiting value.

6. A device for determining whether a possible defect of one or multiple component(s) is unambiguously determinable based on results of predefined diagnostic options, comprising:
(a) a memory device to store, in a matrix, numerical parameters which, for each combination of one possible defect of one of the components and one possible diagnosis result, provide a measure of whether the respective defect is possible when the respective diagnosis result is present, each of the rows of the matrix being assigned to one of the possible diagnosis results, and each of the columns of the matrix being assigned to one of the possible defects;
(b) a selection device to select at least two rows of the matrix which, for a diagnosis result which is consistent with a defect to be identified, includes a parameter which is greater than a predefined first limiting value;
(c) a calculation device to calculate a result vector by the element-wise multiplication of the at least two selected rows of the matrix; and
(d) a determination device to determine whether the result vector includes at least one element which is not smaller than a predefined second limiting value, the elements of the result vector which are smaller than the predefined second limiting value not being greater than a predefined third limiting value.

7. The device of claim 6, wherein the determination device is further configured to determine whether the result vector includes exactly one element which is greater than the predefined second limiting value, the other elements of the result vector which are smaller than the predefined second limiting value not being greater than the predefined third limiting value, or whether the elements of the result vector which are not smaller than the predefined second limiting value are assigned to the same component.

8. The device of claim 6, wherein the parameters are greater than or equal to zero "0" and smaller than or equal to one "1", the parameters in particular being zero "0" or one "1".

9. The device of claim 6, wherein the memory device is further configured to store an expenditure parameter for each diagnostic option which, in particular, describes the expenditure and/or the costs of the respective diagnostic option, further comprising:
an addition device to add the expenditure parameters of the diagnostic options whose parameters are multiplied with one another in order to determine the overall expenditure; and
a diagnosis selection device to select the combination of diagnostic options having the least overall expenditure.

10. A device for determining whether a possible defect of one or multiple component(s) is unambiguously determinable based on results of predefined diagnostic options, comprising:
(a) a memory device to store, in a matrix, numerical parameters which, for each combination of one possible defect of one of the components and one possible diagnosis result, provide a measure of whether the respective defect is possible when the respective diagnosis result is present, each of the columns of the matrix being assigned to one of the possible diagnosis results, and each of the rows of the matrix being assigned to one of the possible defects;
(b) a selection device to select at least two columns of the matrix which, for a diagnosis result which is consistent with a defect to be identified, includes a parameter which is greater than a predefined first limiting value;
(c) a calculation device to calculate a result vector by the element-wise multiplication of the at least two selected columns of the matrix; and
(d) a determination device to determine whether the result vector includes at least one element which is not smaller than a predefined second limiting value, the elements of the result vector which are smaller than the predefined second limiting value not being greater than a predefined third limiting value.

* * * * *